US009056640B2

(12) United States Patent
Vineyard

(10) Patent No.: US 9,056,640 B2
(45) Date of Patent: Jun. 16, 2015

(54) RETRACTABLE VERTICAL MOUNT BICYCLE STORAGE RACK

(71) Applicant: David Ashley Vineyard, Kennesaw, GA (US)

(72) Inventor: David Ashley Vineyard, Kennesaw, GA (US)

( * ) Notice: Subject to any disclaimer, the term of this patent is extended or adjusted under 35 U.S.C. 154(b) by 87 days.

(21) Appl. No.: 13/859,708

(22) Filed: Apr. 9, 2013

(65) Prior Publication Data

US 2013/0270201 A1   Oct. 17, 2013

Related U.S. Application Data

(60) Provisional application No. 61/624,268, filed on Apr. 14, 2012.

(51) Int. Cl.
*A47F 7/00* (2006.01)
*B62H 3/06* (2006.01)
*B62H 3/12* (2006.01)

(52) U.S. Cl.
CPC ... *B62H 3/06* (2013.01); *B62H 3/12* (2013.01)

(58) Field of Classification Search
CPC ............. B62H 3/12; B62H 3/00; B62H 3/02; B62H 3/04; B62H 3/08; B62H 2003/00; B62H 2700/00; B62H 2700/005; B62H 5/00; B62H 5/005; B62H 1/02; B62H 1/04; B62H 3/06; B60R 9/10; B60R 9/06; A47F 10/04; A47F 5/0892; A47F 7/04; A47B 81/007; A47B 43/00; A47B 43/003; A47B 43/006; B65D 85/06; B62D 43/02; B62D 43/00; B62D 43/005; B62D 43/007; B06F 57/08; B06F 57/12; B06F 57/125; B25H 1/0014

USPC ........ 211/21, 20, 18, 19, 17, 87.01, 175, 195, 211/96, 100, 104
See application file for complete search history.

(56) References Cited

U.S. PATENT DOCUMENTS

| | | | | |
|---|---|---|---|---|
| 598,547 A * | 2/1898 | White | ............................. | 211/21 |
| 607,024 A * | 7/1898 | Durfee et al. | .................. | 211/18 |
| 610,656 A * | 9/1898 | Martin | ............................. | 211/18 |
| 615,264 A * | 12/1898 | Du Pont | ......................... | 211/19 |
| 618,394 A * | 1/1899 | Clark | .............................. | 211/18 |
| 643,016 A * | 2/1900 | Thum | .............................. | 211/18 |
| 679,794 A * | 8/1901 | Sweet | ............................. | 211/19 |
| 2,706,049 A * | 4/1955 | Andrews | ....................... | 224/482 |
| 3,976,200 A * | 8/1976 | Munns | ............................ | 211/18 |
| 4,114,764 A * | 9/1978 | Rich | ............................. | 211/100 |
| 4,136,782 A * | 1/1979 | Hugel | ............................ | 211/19 |
| 4,343,404 A * | 8/1982 | Folsom | .......................... | 211/17 |
| 4,400,129 A * | 8/1983 | Eisenberg et al. | ............ | 414/462 |
| 5,056,700 A * | 10/1991 | Blackburn et al. | ............ | 224/324 |
| 5,246,120 A * | 9/1993 | Walker | ............................ | 211/19 |
| 5,474,189 A * | 12/1995 | Peterson | ......................... | 211/18 |

(Continued)

*Primary Examiner* — Jennifer E Novosad

(57) ABSTRACT

The invention (10), Retractable Vertical Mount Bicycle Storage Rack, is a manufactured mechanical assembly that serves as a stationary bicycle storage device, where a bicycle is conveniently stored in a vertical configuration. The invention is a mechanical mechanism that extends outward away from its mounting surface (example=wall, post, etc.) creating an articulating cradle-like assembly for allowing a bicycle to be stored vertically, and may be retracted towards its mounting surface when not in use. The invention utilizes mechanical geometry to maintain its position in both positions, extended and retracted. The bicycle maintains its position with gravity and only contacts the invention with its front tire, thus protecting any delicate bicycle components from physical contact with the storage rack.

1 Claim, 3 Drawing Sheets

(56) References Cited

U.S. PATENT DOCUMENTS

| | | | |
|---|---|---|---|
| 5,529,231 A * | 6/1996 | Burgess | 224/502 |
| 5,685,686 A * | 11/1997 | Burns | 414/462 |
| 5,702,007 A * | 12/1997 | Fritz et al. | 211/17 |
| 5,730,345 A * | 3/1998 | Yeckley et al. | 224/505 |
| 6,095,344 A * | 8/2000 | White | 211/17 |
| 6,302,278 B1 * | 10/2001 | Dueck | 211/17 |
| 6,691,878 B1 * | 2/2004 | Ouitz | 211/104 |
| 7,240,816 B2 * | 7/2007 | Tsai | 224/501 |
| 7,341,417 B1 * | 3/2008 | Lohr | 414/462 |
| 7,854,331 B2 * | 12/2010 | Ouyang | 211/18 |
| 7,946,432 B1 * | 5/2011 | Swanson et al. | 211/20 |
| 2007/0256989 A1 * | 11/2007 | Steadman et al. | 211/21 |
| 2009/0178984 A1 * | 7/2009 | Ouyang | 211/18 |
| 2010/0237213 A1 * | 9/2010 | Wang | 248/324 |
| 2012/0043286 A1 * | 2/2012 | Noyes | 211/22 |
| 2012/0312760 A1 * | 12/2012 | Larson | 211/1.51 |

\* cited by examiner

RETRACTABLE VERTICAL MOUNT BICYCLE STORAGE RACK

COPYRIGHT AUTHORIZATION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

CROSS-REFERENCE TO RELATED APPLICATIONS

Provisional Patent Application: 61/624,268

This Nonprovisional Utility Patent Application for a Retractable Vertical Mount Bicycle Storage Rack shall cross-reference to the related Provisional Application No. 61/624,268 submitted on Apr. 14, 2012 by David Ashley Vineyard of Kennesaw, Ga., U.S.A. The function and description of the subject matter on this nonprovisional utility application directly relates to the provisional application in its entirety.

STATEMENT REGARDING FEDERALLY SPONSORED RESEARCH OR DEVELOPMENT

"Not Applicable"

REFERENCE TO SEQUENCE LISTING, A TABLE, OR A COMPUTER PROGRAM LISTING COMPACT DISK APPENDIX

"Not Applicable"

BACKGROUND OF THE INVENTION

Bicycle storage devices come in a wide variety of designs to meet the needs of many people and their unique storage situations. Furthermore, bicycles also come in wide variety of styles, sizes, and shapes. And, not all bicycle shapes work with all storage racks. Of the bicycle storage racks and mounts current in the field, generally they are rigid designs that do not conveniently fold inward upon themselves when not in use. Most people store their bicycles using kickstands, floor standing mounts, or wall-mounted hooks. While these types of bicycle storage devices are convenient for the user, they may not store the bicycle in a manner that is space-friendly or gentle on the user or the bike itself. Furthermore, most retail bicycle stores utilize massive rigid racks that are space hogs and may not be safe for customers. Lastly, many existing bicycle racks do provide safe proper clearance around delicate mechanical hardware components (such as brake rotors, brake calipers, brake cables, brake hoses, gear selection cables) existing on modern bicycles.

Many modern bicycles commonly are made from expensive hi-tech materials that are easy to damage and expensive to replace or repair. Thus, a bicycle storage rack where the bicycle is stored safely out of harm's way and the rack only contacts the bicycle at the tires is the solution.

The invention (10) disclosed here is a Retractable Vertical Mount Bicycle Rack that serves the purpose of safely storing a bicycle (reference) of most any size, design, or shape in vertical fashion. This design does not use any hooks that can damage or mar the finish of the bicycle frame or the wheel rims. The only contact that the bicycle will experience is where the front wheel is cradled in the invention (10) and is held in position with gravity. The invention (10) is to be fastened to any suitable vertical surface of structural soundness. The invention may be fastened to a wall (reference), a post, etc. using standard anchor bolts, lag bolts, masonry bolts, toggle bolts, construction screws, or any other suitable fastener. Because the bicycle is stored vertically, valuable floor space is open for other things.

The invention (10) is different from prior art from the standpoint that it is a mechanical mechanism that utilizes pivot points and a guided slide that allow the rack to collapse inward upon itself when not in use so that it is not protruding into the user's space. Secondly, it is designed to be attractive so that it will easily fit into any style home, whether in the living space, in the garage, or just outside the front door. Thirdly, the invention (10) provides safe proper clearance around delicate mechanical hardware components (such as brake rotors, brake calipers, brake cables, brake hoses, gear selection cables) existing on modern bicycles while storing the bicycle in a convenient easy-to-use design.

BRIEF SUMMARY OF THE INVENTION

The invention (10) is a manufactured mechanical assembly that serves as a stationary bicycle storage device, where a bicycle (reference) is conveniently stored in a vertical configuration. The invention is a mechanical mechanism that extends outward away from its mounting surface (example=wall, post, etc.) for allowing a bicycle to be stored vertically, and may be retracted towards its mounting surface when not in use. The invention utilizes mechanical geometry to maintain its position in both positions, extended and retracted. The bicycle (reference) maintains its position with gravity and only contacts the invention with its tires.

The invention (10) extends outward away from its mounting surface and locks into its "open" position allowing a bicycle to be stored in a vertical orientation. The combination of two pivot joints and one track-guided slide allows the invention to retract in a manner that collapses upon itself for a low profile whenever it is not in use. This design is different from other vertical storage bicycle rack designs that do not retract or collapse upon themselves, nor does it utilize hooks that contact the rims of the bicycle.

Whenever the invention is anchored rigidly and securely to the mounting surface, the invention (10) may be extended to its "open" position [see FIG. 2]. The invention allows the user to safely and carefully roll the bicycle into the invention, after the user carefully rolls, or tilts, the bicycle onto its rear wheel. The user will roll the bicycle toward the invention until the front bicycle wheel contacts the Long Cross Bar (20), which is the leading horizontal structural member attaching the Cradle Arms (14). The user will continue to roll the bicycle into the invention by now rolling on the front wheel, ultimately lifting the rear bicycle wheel off the ground. The front bicycle wheel will continue to roll into the invention until the wheel is settled and resting upon the Long Cross Bar (20) and the Short Cross bar (22), which is the trailing horizontal structural member attaching the Pivot Struts (16). The upper portion of the bicycle wheel is stabilized by two Stabilizer Brackets (30), which prevents the wheel from falling over to one side or the other. The bicycle wheel is further stabilized by the Stabilizer Pins (34), which help prevent the bicycle tire from sliding excessively to one side or the other.

To enhance safety and security of the bicycle when being stored in the invention, the user will utilize the Bicycle Retention Safety Strap (40) to tie the bicycle to the invention. The safety strap is attached to one side of the invention and is passed through the front wheel of the bicycle (reference), and then secured on the other side of the invention. The soft material of the strap prevents scratches or damage to the bicycle wheel. Once the Bicycle Retention Strap is pulled tight to the wheel, it prevents the bicycle from being accidentally pulled out of the rack or prevents the bike from shaking out of the rack in the event of an earthquake or other shock or impact motion to the rack.

BRIEF DESCRIPTION OF THE SEVERAL VIEWS OF THE DRAWINGS

FIG. 2A is an overhead view of the invention, looking down from above.

FIG. 2B is a front elevation view, looking directly at the invention.

FIG. 2C is a side elevation view of the invention, looking at it from the right hand side.

FIG. 3A is an overhead view of the invention, looking down from above.

FIG. 3B is a front elevation view, looking directly at the invention.

FIG. 3C is a side elevation view of the invention, looking at it from the right hand side.

DETAILED DESCRIPTION OF THE INVENTION

It should be noted that for the purpose of understanding and clarity, identical features having identical functions have been identified with the same reference numbers in each of the figures provided in this document.

The invention may be made from any appropriate rigid material, and of any width or thickness. The invention may be made from any combination of suitable materials. The material may be of any appropriate origin: natural/organic or synthetic (man-made). Examples of appropriate materials may be (but not limited to): wood, steel, aluminum, any type of metal, any type of plastic, any type of composite, etc.

Figure 1:
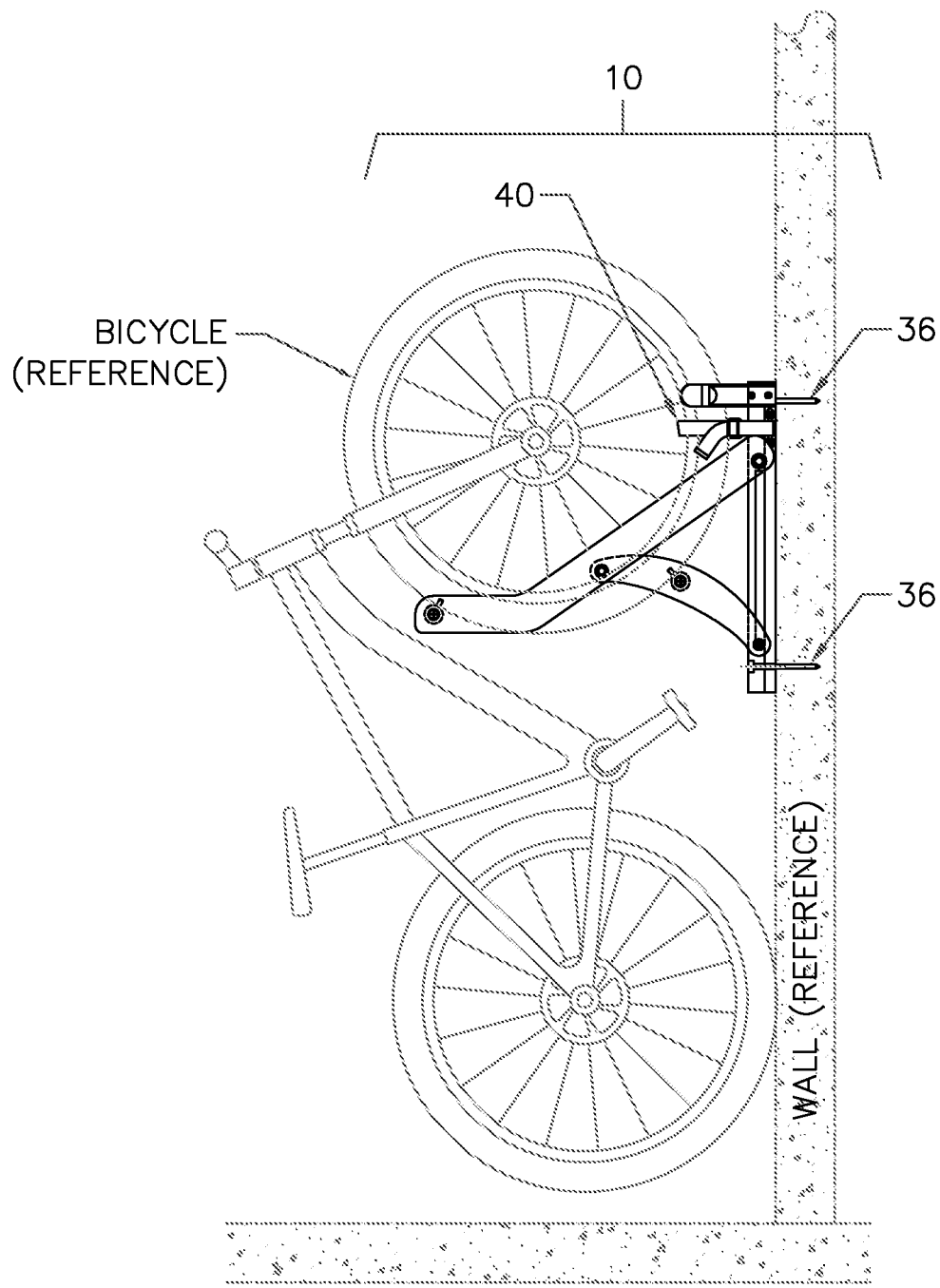
FIG. 1 is a side elevation view of the invention (10), Retractable Vertical Mount Bicycle Storage Rack, in its assembled form (ASSEMBLY VIEW), shown in active use, mounted to a rigid wall (reference) with a typical bicycle (reference) in a stored position. The invention (10) is mounted to the wall with standard anchor screws (36) of appropriate size and length for the wall material and the applied weight. The Bicycle Retention Safety Strap (40) secures the bicycle in the rack.
Figure 2:
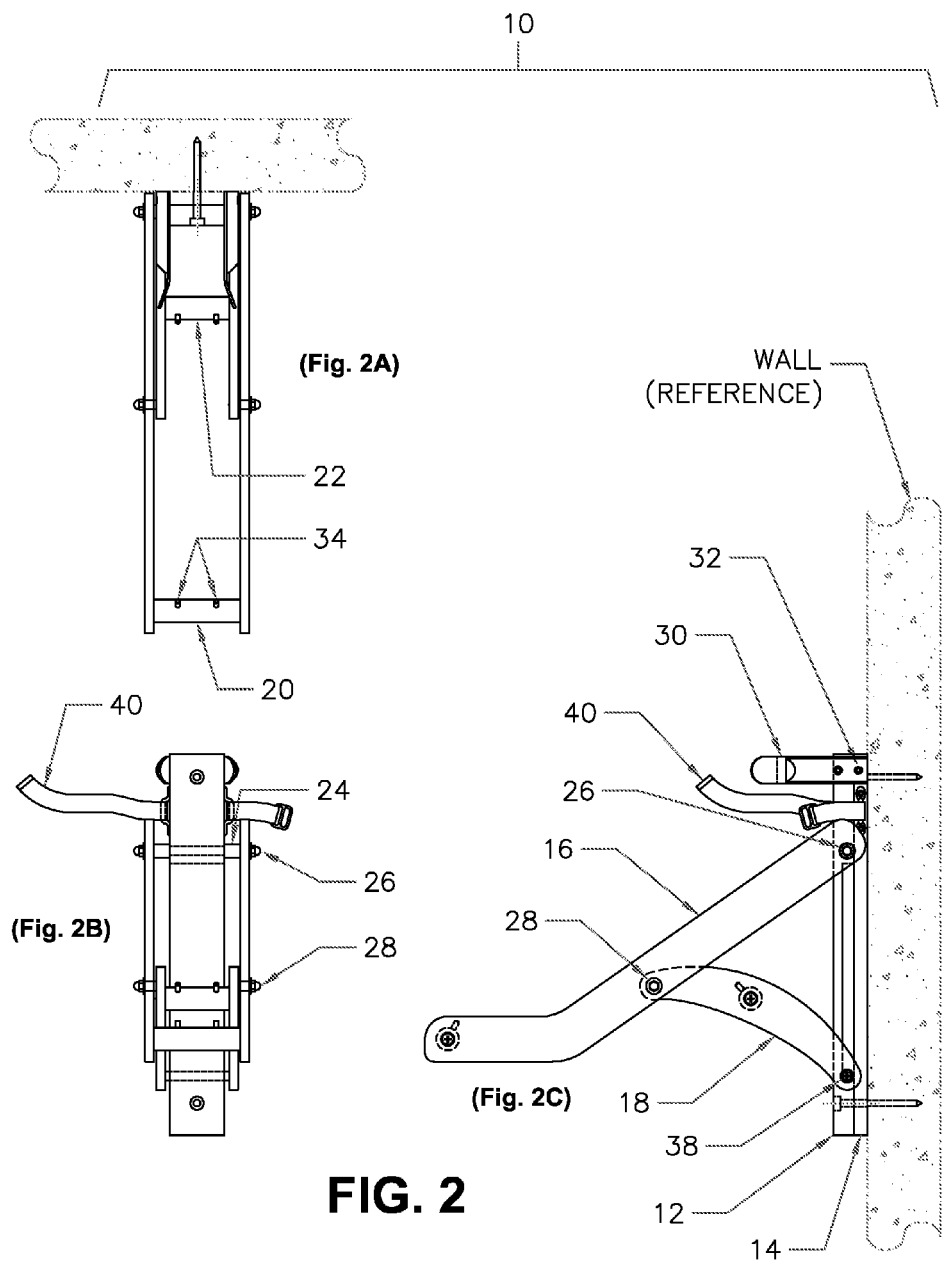
FIG. 2 is a 3-view detailed drawing of the invention (10), Retractable Vertical Mount Bicycle Storage Rack, shown with all of its useful components (items 12, 14, 16, 18, 20, 22, 24, 26, 28, 30, 32, 34, 38, and 40). The invention is shown in its "open" (ready for use) configuration.
Figure 3:
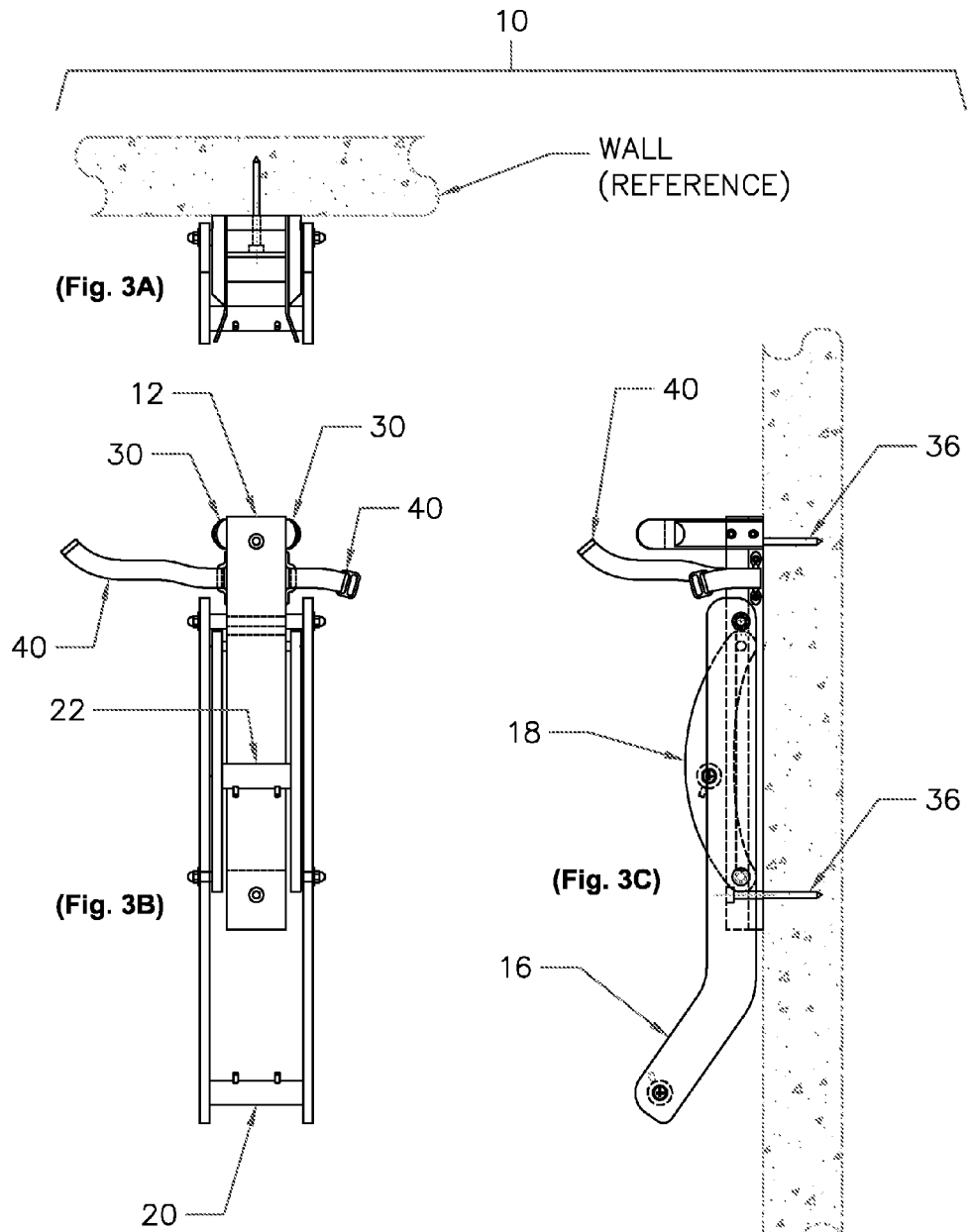
FIG. 3 is a 3-view detailed drawing of the invention (10), Retractable Vertical Mount Bicycle Storage Rack, shown with all of its useful components and highlighting the primary components (items 12, 16, 18, 20, 22, 30, 36, and 40). The invention is shown in its "closed" (low-profile stored) configuration.

The following is a list of the various components of the invention. Each of the following items is identified in FIG. 1, FIG. 2, and FIG. 3.

The Invention 10. The overall assembly: "Retractable Vertical-mount Bicycle Rack"

Primary Backplate 12. The primary backplate is a continuous length of material that is mounted in a vertical fashion to any reasonable vertical mounting surface (wall, post, etc.). The primary backplate is rectangular in shape, with its length mounted in the vertical direction. The side facing the user is smooth and aesthetically pleasing. The backside of the material has a long vertical trough (or, cutout) that creates a track for the sliding action of the two Pivoting Struts (18). Mounting holes (through holes) are located at each end of the backplate for mounting the invention to its mounting surface (wall, post, etc.).

Spacer Plate 14. The spacer plate is a continuous length of material that is mounted in a vertical fashion. The spacer plate is rectangular in shape, with its length mounted in the vertical direction directly under the Primary Backplate (12). Mounting holes (through holes) are located at each end of the spacer plate which corresponds to the mounting holes of Primary Backplate (12).

Cradle Arm 16. The Cradle Arm is a structural member that is mounted to the Primary Backplate (12) at a first pivot point on one end and connects to a Pivoting Strut (18) at a second pivot point located at a geometric position (which may or may not symmetrically) located along its length. There are two Cradle Arms on the invention assembly. At the opposing end (opposite from the first pivot point), the two Cradle Arms are connected to each other with one Long Cross Bar (20), thus creating a swinging cradle assembly. When the invention (10) is extended to its "open" position, the Cradle Arms are the primary load-bearing cantilevered members.

Pivoting Strut 18. There are two pivoting struts on the invention assembly. One end of each pivoting strut connects to a corresponding Cradle Arm (16) at a pivot point using the Strut Pivot Hardware (28). At a mid-position (symmetrical or asymmetrical), the two pivoting struts are connected to each other with one Short Cross Bar (22). At the opposite end from the pivot point, the two Pivoting Struts are connected by the Slide Hardware (38) that slides within the track provided by the Primary Backplate (12). When the invention (10) is extended to its "open" position, the pivoting struts hold the Cradle Arms (16) in their extended position for accepting a bicycle for storage.

Long Cross Bar 20. The Long Cross Bar is a connecting structural member that joins the two Cradle Arms (16) together at their non-pivoting end. The Long Cross Bar is the primary point of contact for the bicycle when the invention is in use.

Short Cross Bar 22. The Short Cross Bar is a connecting structural member that joins the two Pivoting Struts (18) together at their midpoints. The Short Cross Bar is the secondary point of contact for the bicycle when the invention is in use.

Pivot Spacer 24. The Pivot Spacer is a piece of fastening hardware that serves as a structural spacer device that works with the Primary Pivot Hardware (26) to fasten the two Cradle Arms (16) to the Primary Backplate (12).

Primary Pivot Hardware 26. The Pivot Hardware may be any reasonable material that may serve to allow the Cradle Arms (16) to swing/pivot at the primary pivot point located on the Primary Backplate (12). The pivot hardware may include a threaded axle, some washers, spacers, and some nuts.

Strut Pivot Hardware 28. The Strut Pivot Hardware may be any reasonable material that may serve to allow the Pivoting Strut (18) to swing/pivot at its connecting pivot point on the Cradle Arm (16). The pivot hardware may include a bolt, spacer tube, some washers, and a nut.

Stabilizer Bracket 30. The Stabilizer Bracket serves to maintain the vertical orientation of the bicycle wheel whenever the invention is in use and a bicycle is mounted in the invention. The Stabilizer Bracket is designed to capture the upper portion of the bicycle wheel by providing a fork-shaped pocket. Depending upon the decorative shape of the Stabilizer Bracket, there may be two brackets or just one, as long as the function of maintaining the bicycle wheel's vertical position is satisfied.

Stabilizer Bracket Hardware 32. The Stabilizer Bracket Hardware mounts the Stabilizer Bracket (30) to the upper portion of the Primary Backplate (12) and the Spacer Plate (14).

Stabilizer Pins 34. The Stabilizer Pins serves to maintain the vertical orientation of the bicycle wheel whenever the invention is in use and a bicycle is mounted in the invention. Stabilizer Pins may be located on the Long Cross Bar (20) or the Short Cross Bar (22).

Anchoring Hardware 36. The Anchoring Hardware serves to mount the invention to any suitable vertical mounting surface. The anchoring hardware must be appropriate in both type and size for the mounting surface material.

Slide Hardware 38. The Slide Hardware provides a rigid link between the Pivoting Struts (18) and consists of two flathead machine screws and one female-threaded spacer tube. The spacer tube travels within the guide track created by the Primary Backplate (12) and the Spacer Plate (14).

Bicycle Retention Safety Strap 40. The Bicycle Retention Safety Strap is a soft material strap feature that provides safety in that it prevents the bicycle from being accidentally pulled out of the rack or prevents the bike from shaking out of the rack in the event of an earthquake or other impact shock. The safety strap is rigidly fastened to one user-accessible side (first side) of the Primary Backplate (12) at an elevation that is equal to the centerline (or near centerline) axle of the bike wheel. It is long enough to be threaded through the interior of the bike wheel and over to the opposite side (second side) of the Primary Backplate (12). On the second side of the Primary Backplate (12), an appropriate hardware is securely fastened that allows the Bicycle Retention Safety Strap to be threaded through the hardware, pulled tight, and have its tension retained. The hardware may be any appropriate device such as a webbing thread plate, a slip buckle, a pair of slide buckles, footman loops, a D-ring, etc. The soft material of the strap may be any appropriate flexible material that prevents scratches or damage to the bicycle wheel.

Assembly of the Invention: To assemble the invention (10), the Primary Backplate (12) is fitted together with the Spacer Plate (14) where the mounting holes of both pieces match. The long vertical trough on the backside of the Primary Backplate (12) faces towards the Spacer Plate (14), thus creating a guide track for the Slide Hardware (38) that connections the two ends of the Pivoting Struts (18). The Primary Backplate (12) and the Spacer Plate (14) are fastened to the vertical mounting surface (wall, post, etc.) utilizing the Anchoring Hardware (36). The Primary Backplate and Spacer Plate may be permanently joined, or created from one piece of material.

Two Pivoting Struts (18) are rigidly connected to each other at two points: using one Short Cross Bar (22) at the mid position and the Slide Hardware (38) at the distal position. The Pivoting Struts are rigidly connected to each other so that they are even, square, and parallel to each other, creating a pivoting strut assembly. The proximal ends of the two Pivoting Struts are connected to the two Cradle Arms (16) with the Strut Pivot Hardware (28).

The outermost ends of the two Cradle Arms (16) are rigidly connected to each other with one Long Cross Bar (20). The opposite ends of the two Cradle Arms are rigidly connected to each other with the Primary Pivot Hardware (26), and the Primary Pivot Hardware passes through the pivot hole in the upper portion of the Primary Backplate (12). The two Cradle Arms are rigidly connected to each other so that they are even, square, and parallel to each other, and create a cradle arm assembly.

At the mid-point along the length of the two Cradle Arms (16), the two Pivot Struts (18) connect to the cradle arms with the Strut Pivot Hardware (28). The two Pivot Struts (18) are closer together than the two Cradle Arms (16); therefore, the two Pivot Struts connect to the interior side of the two Cradle Arms.

The assembly creates a scissor-like action so that whenever the free end of the cradle arm assembly is lifted, the Pivot Struts (18) pivot about the Pivot Strut Hardware (28) and the Slide Hardware (38) slide along the guide track made by the Primary Backplate (14) and the Spacer Plate (14).

Stabilizer Brackets (32) are attached to the upper portion of the Primary Backplate (12), using the Stabilizer Hardware (32). The Stabilizer Brackets are designed to capture to the upper portion of the bicycle wheel by providing a fork-shaped pocket.

Stabilizer Pins (34) may be added to the Long Cross Bar (20) and the Short Cross Bar (22) at an angular position that will align with the bicycle tire once the bicycle is mounted in the invention (10).

To Open the Invention: To open the invention from its "closed" (retracted) position, [see FIG. 3], where the two Cradle Arms (16) are parallel to the Primary Backplate (12), and the two Pivoting Struts (18) are also parallel with the Primary Backplate and nested within the two Cradle Arms (16), the user will lift up on the Cradle Arms (16) and pivot them outward and upward, thus also pivoting the two Pivot Struts outward also. Whenever the Cradle Arms are pivoted out far enough, the Slide Hardware (26) will begin to slide toward the bottom of the guide track. The Slide Hardware will settle at the bottom of the guide track, and the geometry created by the resting position of the Cradle Arms (16) and Pivoting Struts (18) will allow the assembly to hold its position. The bicycle rack is now ready to receive a bicycle for storage.

To Close the Invention: To close the invention from its "open" (extended) position, [see FIG. 2], the user will lift up on the Cradle Arms (16) and pivot them outward and upward. Whenever the Cradle Arms are pivoted out far enough, the user will also lift up on the assembly created by the Pivot Struts (18). The Slide Hardware (26) will begin to slide toward the top of the guide track, and will settle at the top of guide track as the Cradle Arms and the Pivot Struts nest together and are parallel to the Primary Backplate (14). The geometry created by this nested position of the Cradle Arms (16) and Pivoting Struts (18) will allow the assembly to hold its position.

Storing a Bicycle in the Invention: Referring to [FIG. 1], the invention (10) shall be mounted in a similar manner shown in FIG. 1, anchored rigidly and securely to the mounting surface (example—wall (reference)). The invention (10) shall be in its "open" position [see FIG. 2]. The user will safely and carefully roll, or tilt, the bicycle (reference) onto its rear wheel. The user will then roll the bicycle toward the invention until the front bicycle wheel contacts the Long Cross Bar (20). The user will continue to roll the bicycle into the invention by now rolling on the front wheel which lifts the rear bicycle wheel off the ground. The front bicycle wheel will continue to roll into the invention until the wheel is settled and resting upon the Long Cross Bar (20) and the Short Cross bar (22). The upper portion of the bicycle wheel is stabilized by the Stabilizer Brackets (30), which prevents the wheel from falling over to one side or the other. The bicycle wheel is further stabilized by the Stabilizer Pins (34), which help prevent the bicycle tire from sliding excessively to one side or the other.

What is claimed is:

1. A retractable vertical mount bicycle storage rack comprising:
   - a spacer plate having a rear surface adapted to be mounted to a vertical mounting surface, a left side and a right side, and a front surface;
   - a vertically oriented plate attached to the front surface of the spacer plate and having a top end, a bottom end, a left side, and a right side, whereby a pivot point is located near the top end of the vertically oriented plate; a vertically oriented slot is located in between the spacer plate and the vertically oriented plate and extends in between the right and left sides of the spacer plate and vertically oriented plate, whereby the vertically oriented slot has an uppermost point and a lowermost point, and the slot is located directly under the pivot point;
   - a first and second cradle arm, whereby the first arm is located on the left side of the plates and the second arm is located on the right side of the plates, and the cradle arms separated by a first horizontal spacer attached at proximal ends thereof, whereby the first horizontal spacer extends through the pivot point, and the cradle arms having a second horizontal spacer attached at free opposite distal ends of each of the cradle arms;
   - a first and second structural support member, whereby the first support member is located on the left side of the plates and the second support member is located on the right side of the plates, and the support members are separated by a third horizontal spacer attached at mid-positions of the two said support members and a fourth horizontal spacer attached at proximal ends thereof which interacts with and extend through said vertically oriented slot;
   - said structural support members connect at two opposing pivot joints at a mid-position of each of said cradle arms creating two opposing articulating joints;
   - two opposing stabilizer brackets located at the top of the rack to provide stabilization to a front wheel of bicycle that is adapted to rest upon the second horizontal spacer located at the distal ends of the two said cradle arms and the third horizontal spacer located at the mid-position of the two said support members, thus preventing the wheel from tilting excessively to one side or the other;
   - a bicycle retention safety strap assembly located between said stabilizer brackets and said pivot point for securing the front wheel to the rack; whereby the strap assembly comprises a first sub-assembly which attaches to the left side of the mounting plate or vertically oriented plate with a first footman's loop, and the strap assembly further comprises a second sub-assembly having a buckle at a free end thereof, and the second sub-assembly attaches to the right side of the mounting plate or vertically oriented plate by a second footman's loop; said first sub-assembly is adapted to pass through the front wheel resting in said rack and interfaces with said buckle of the said second sub-assembly and is pulled to capture said front wheel to the rack;
   - wherein when said rack is in an open position, said cradle arms and said support members freely extend outward from the rack and mechanically lock into the open position when the fourth spacer is located at the lowermost point of the vertical slot, thereby allowing the bicycle to be stored in a vertical orientation and only making contact with the front wheel and holding the longitudinal axis of the bicycle parallel to the mounting surface with a rear wheel of the bicycle hanging freely below; and
   - wherein when said rack is in a closed position, said rack utilizes a combination of the pivot point, said two pivot joints at the mid-position of the cradle arms, and said slot to allow the rack to freely retract and collapse upon itself for a low profile, when the cradle arms are pivoted about the articulating joints and said fourth spacer is located at the uppermost point of the vertical slot.

* * * * *